(12) United States Patent
Meyer

(10) Patent No.: US 7,467,553 B2
(45) Date of Patent: Dec. 23, 2008

(54) CAPACITIVELY COUPLED RESONATOR DRIVE

(75) Inventor: Robert J. Meyer, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 399 days.

(21) Appl. No.: 11/317,959

(22) Filed: Dec. 22, 2005

(65) Prior Publication Data
US 2007/0144257 A1   Jun. 28, 2007

(51) Int. Cl.
*G01P 15/097* (2006.01)

(52) U.S. Cl. .................... 73/514.29; 73/862.59

(58) Field of Classification Search ............. 73/514.29, 73/514.18, 514.35, 862.59
See application file for complete search history.

(56) References Cited

U.S. PATENT DOCUMENTS

| | | | |
|---|---|---|---|
| 4,372,173 A | 2/1983 | EerNisse et al. | |
| 4,766,768 A | 8/1988 | Norling et al. | |
| 4,879,914 A | 11/1989 | Norling | |
| 4,901,586 A | 2/1990 | Blake et al. | |
| 5,005,413 A | 4/1991 | Novack et al. | |
| 5,168,756 A | 12/1992 | Hulsing, II | |
| 5,241,861 A | 9/1993 | Hulsing, II | |
| 5,243,278 A | 9/1993 | Hulsing, II | |
| 5,331,242 A | 7/1994 | Petri | |
| 5,367,217 A | 11/1994 | Norling | |
| 5,456,111 A | 10/1995 | Hulsing, II | |
| 5,668,329 A | 9/1997 | Petri | |
| 5,780,742 A * | 7/1998 | Burns et al. ............. | 73/514.29 |
| 5,948,981 A | 9/1999 | Woodruff | |
| 6,145,380 A | 11/2000 | MacGugan | |
| 6,745,627 B1 | 6/2004 | Woodruff | |

OTHER PUBLICATIONS

Helsel M et al.; A navigation grade micro-machined silicon accelerometer; Position Location and Navigation Symposium, Apr. 11-15, 1994; New York, NY, pp. 51-58.

* cited by examiner

*Primary Examiner*—John E Chapman

(57) ABSTRACT

An apparatus and method for a micro-machined device having a movable mass rotatably suspended from a frame by one or more hinges for rotation relative thereto frame. A DETF resonator is suspended between the frame and reaction mass, and a capacitor is provided between the frame and movable mass for transmitting a drive signal to the DETF resonator.

18 Claims, 4 Drawing Sheets

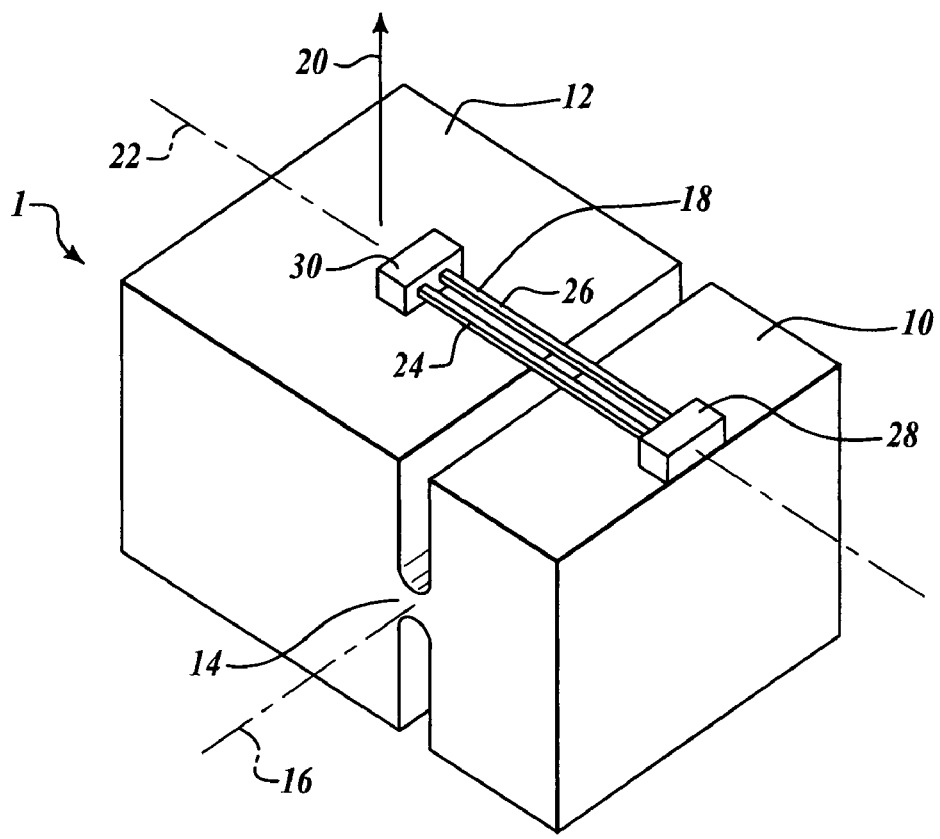
FIG. 1 *(PRIOR ART)*
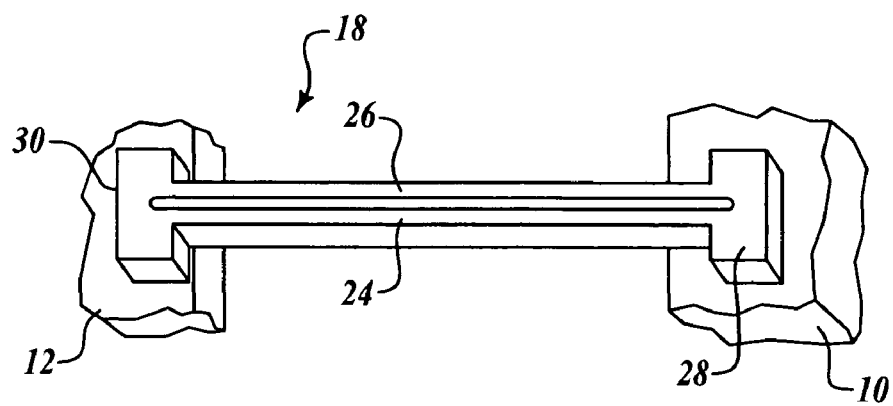
FIG. 2 *(PRIOR ART)*

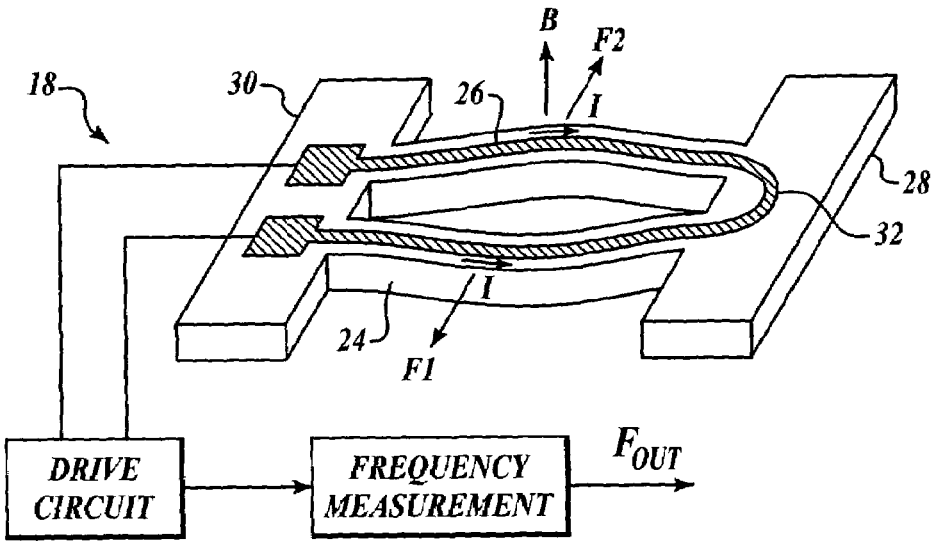
FIG. 3 *(PRIOR ART)*
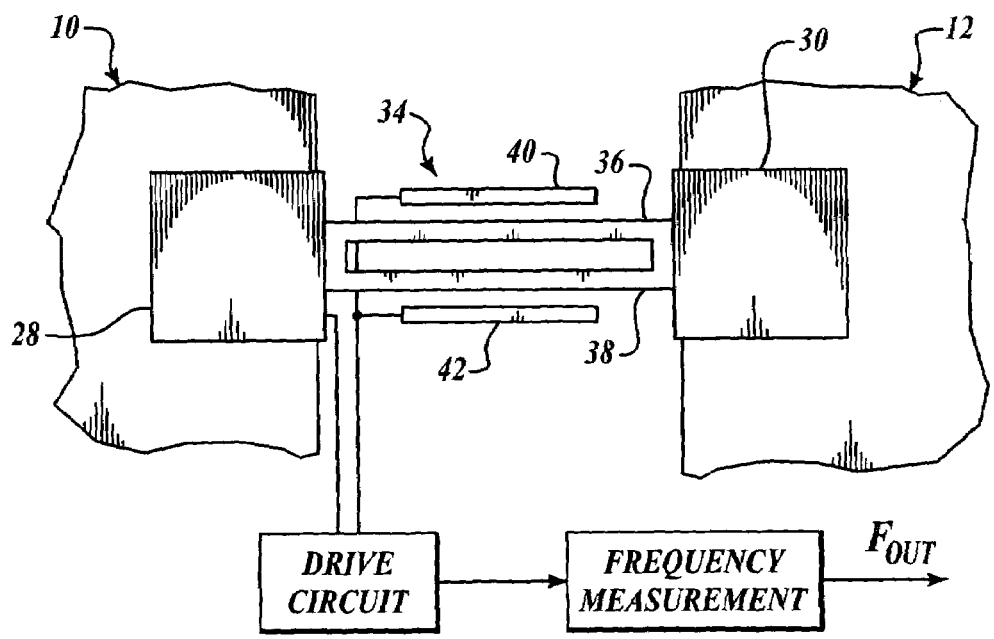
FIG. 4 *(PRIOR ART)*

CAPACITIVELY COUPLED RESONATOR DRIVE

GOVERNMENT INTEREST

The invention described herein was made in the performance of work under U.S. Government Contract No. F29601-03-C-0124 awarded by the Air Force Research Laboratories (AFRL).

FIELD OF THE INVENTION

The present invention relates to micro-machined sensor and actuator devices and methods, and in particular to micro-machined sensor and actuator devices having tuning fork resonators.

BACKGROUND OF THE INVENTION

Micro-machined sensor and actuator devices having tuning fork resonators are generally well-known. See, for example, FIG. 1 which illustrates a sensor device 1 of the type taught by U.S. Pat. No. 6,145,380, SILICON MICRO-MACHINED ACCELEROMETER USING INTEGRATED ELECTRICAL AND MECHANICAL PACKAGING, which is incorporated herein by reference and is further co-owned by the assignee of the present application. U.S. Pat. No. 6,145,380 teaches an integrated sensor package having an acceleration sensor 1 formed for example as a double-ended tuning fork (DETF) resonator-based acceleration sensor. A typical DETF resonator-based acceleration sensing mechanism includes a frame 10 formed of a suitable substrate material, for example, silicon or quartz. A reaction mass or proof mass 12 is rotatably suspended from frame 10 by one or more hinges 14 for rotation about hinge axis 16. One or more force sensing DETF resonator 18 is suspended between frame 10 and reaction mass 12. As reaction mass 12 rotates relative to frame 10 in response to a force experienced along input axis 20, DETF resonator 18 experiences either a compressive or tensile force along its longitudinal axis 22. In other words, DETF resonator 18 is either compressed or stretched between frame 10 and reaction mass 12 when reaction mass 12 is displaced or rotated away from a null position relative to frame 10. The natural frequency of DETF resonator 18 changes when it is compressed or stretched: the natural frequency decreases below a nominal resonance frequency when DETF resonator 18 is compressed, and increases above a nominal resonance frequency when DETF resonator 18 is stretched. The resulting change in frequency is proportional to the force or acceleration applied to reaction mass 12. This push/pull phenomenon is extensively described in U.S. Pat. No. 5,005,413, which is incorporated herein by reference.

FIG. 2 is a detailed example of DETF resonator 18 formed as a two-tine vibrating beam force sensing DETF resonator. Micro-machined silicon acceleration sensor 1 may employ vibrating beam force sensing resonators of, for example, the general configuration shown in FIG. 4. DETF resonator 18 is formed of two tines 24, 26 attached to mounting tabs 28, 30.

In a typical state of the art micro-machined sensor and actuator devices such as acceleration sensor 1, DETF resonator 18 is typically suspended by mounting tabs 28, 30 between frame 10 and reaction mass 12 across hinge 14. Tines 24, 26 are adapted to vibrate or oscillate at their respective natural frequencies in response to an electronic drive signal applied by a drive circuit.

FIG. 3 illustrates the mechanical operation of DETF resonator 18. U.S. Pat. No. 6,145,380 describes several known methods for inducing oscillation in tines 24, 26. For example, tines 24, 26 may be adapted to accept an electrical current by forming them in a semiconducting material, such as doped conductive polysilicon. In another example, electrically conductive film electrodes may be deposited on a surface of tines 24, 26. Vibration or oscillation of tines 24, 26 may be accomplished by various means. For example, in a typical magnetic drive sensor, tines 24, 26 are mounted within the field, B, of one or more permanent magnets (not shown). A drive circuit applies an oscillating or alternating current, I, in electrically conductive film electrode 32, which induces a sympathetic alternating magnetic field within the conductive film electrode. The alternating or oscillating current-induced magnetic field in the conductive film electrode interacts with the field of the permanent magnets to create forces, F1 and F2, which drive tines 24, 26 into oscillation.

In an alternate configuration (not shown), DETF resonator 18 may be manufactured having four tines. In a four tine resonator, the sensing circuit may have two pair of driven and sensed tines, each pair having an inner tine and an outer tine as described in U.S. Pat. Nos. 5,367,217 and 5,331,242, both incorporated herein by reference.

Alternatively, in an electrostatic or capacitive drive vibratory system 34, as illustrated in FIG. 4. As described in U.S. Pat. No. 6,145,380, tine oscillation may be driven by inducing alternating or oscillating electrostatic forces between electrically conductive surfaces on tines 36, 38 and adjacent conductors 40, 42 mounted on frame 10 adjacent to and coextensive with conductive surfaces on tines 36, 38. Force transducers based upon electrostatically driven DETF resonators are known in the art and are disclosed by example and without limitation in U.S. Pat. Nos. 4,901,586; 5,456,111 and 6,745,627, all commonly assigned to the assignee of the present application and all incorporated herein by reference. Other examples of micro-machined silicon acceleration sensors which may be used with the present invention are described in U.S. Pat. Nos. 4,766,768 and 5,241,861, both commonly assigned to the assignee of the present application and both incorporated herein by reference.

However, in configurations having DETF resonator 18 suspended between frame 10 and reaction mass 12 across hinge 14 with both ends of the DETF resonator 18 being driven, damping loads developed in the physical connection may generate errors in resonator output.

Therefore, devices and methods for overcoming these and other limitations of typical state of the art micro-machined sensor and actuator devices, such as typical state of the art MEMS accelerometer devices, are desirable.

SUMMARY OF THE INVENTION

The present invention overcomes limitations of the prior art by providing an apparatus and method for a micro-machined device formed of a frame and pendulous mass formed of a substrate having first and second opposing substantially parallel spaced-apart planar surfaces. The pendulous mass is formed substantially coplanar with and spaced away from the frame by a gap. A hinge is coupled between the frame and pendulous mass and rotationally suspends the pendulous mass for relative rotational motion about a hinge axis in response to a force experienced along an input axis.

A DETF resonator is suspended between the frame and the reaction mass. A capacitor is arranged between the frame and pendulous mass. An electronic drive circuit is coupled to the capacitor and is structured to apply an alternating current electronic drive signal to the capacitor via an electrically conductive path between the capacitor and the DETF resonator.

According to one aspect of the invention, the capacitor includes a body mounted on the frame and spanning the gap between the frame and pendulous mass. Furthermore, a pair of spaced-apart capacitor plates are formed between the body and pendulous mass.

According to another aspect of the invention, the capacitor is further positioned between the first and second spaced-apart planar surfaces of the substrate of which the frame and pendulous mass are formed.

According to yet other aspects of the invention, a method is provided for forming an apparatus of the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view that illustrates a known micro-machined sensor device of the type taught by U.S. Pat. No. 6,145,380 having a double-ended tuning fork (DETF) resonator of a type that is generally well-known;

FIG. 2 is a perspective view that illustrates a detailed example of a DETF resonator of a type that is generally well-known;

FIG. 3 is a perspective view that illustrates mechanical operation of DETF resonator as taught by U.S. Pat. No. 6,145,380;

FIG. 4 illustrates an electrostatic or capacitive drive vibratory system as taught by U.S. Pat. No. 6,145,380 for use in operating of a DETF resonator;

DETAILED DESCRIPTION OF PREFERRED EMBODIMENT

In the Figures, like numerals indicate like elements.

The Figures illustrate the method and apparatus of the present invention for micro-machined sensor and actuator devices having tuning fork resonators.

Figure 5:
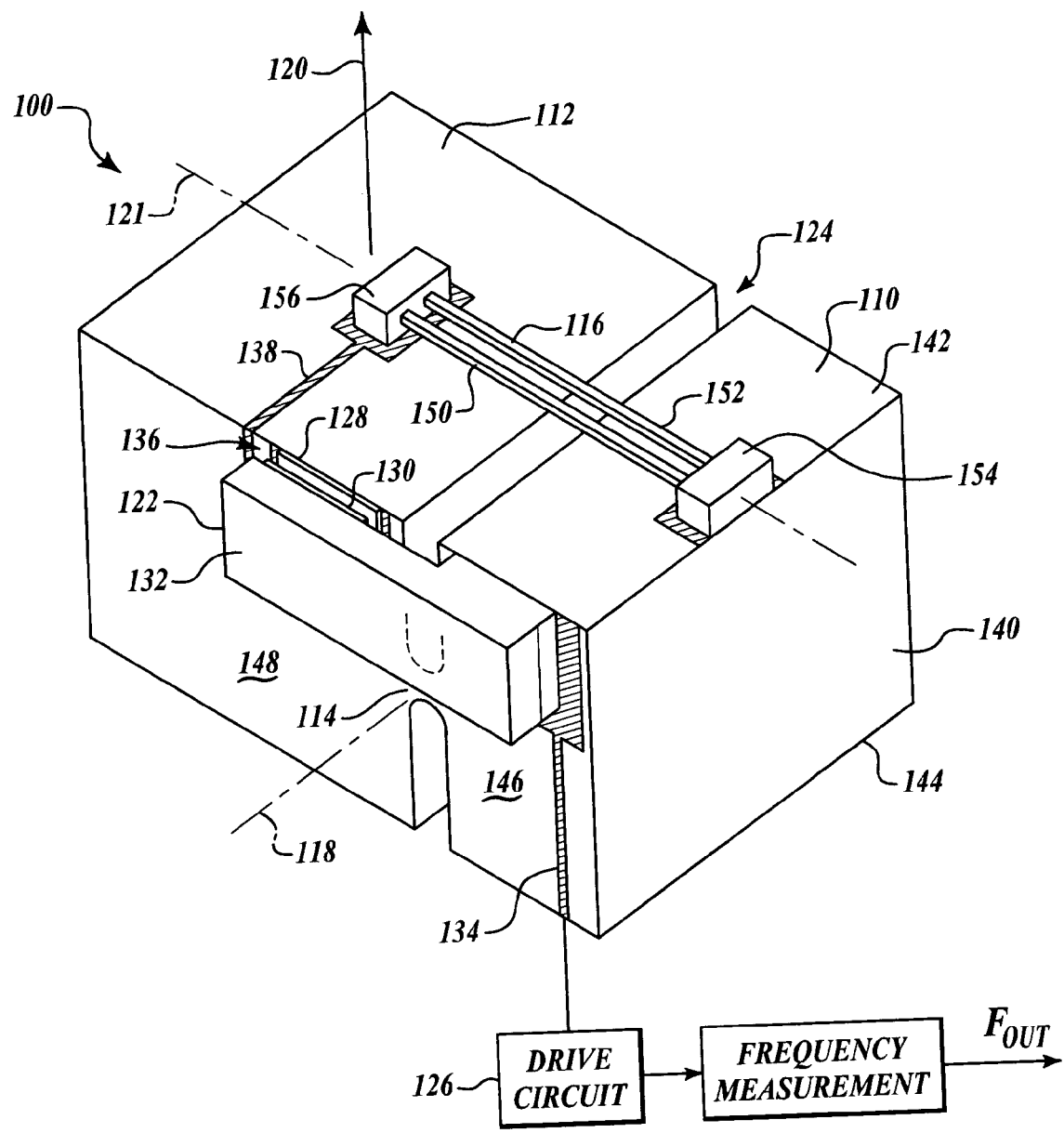
FIG. 5 is a perspective view that illustrates the apparatus of the invention as a micro-machined sensor or actuator device having one or more double-ended tuning fork (DETF) resonators, such as but not limited to a resonator-based acceleration sensor.

FIG. 5 is a perspective view that illustrates the apparatus of the invention as a micro-machined sensor or actuator device 100 having one or more double-ended tuning fork (DETF) resonators, such as but not limited to a resonator-based acceleration sensor. The device 100 includes a frame 110 formed of a suitable monocrystalline or polycrystalline substrate material, for example, silicon or quartz. A pendulous reaction mass or proof mass 112 is integrally formed with the frame 110. Pendulous mass 112 is rotatably suspended from frame 110 by one or more hinges 114 for relative rotational motion about hinge axis 118 in response to a force experienced along input axis 120. One or more force sensing DETF resonator 116 is suspended between frame 110 and reaction mass 112 in a push/pull relationship of a type that is extensively described in U.S. Pat. No. 5,005,413, which is incorporated herein by reference.

Accordingly, as pendulous reaction mass 112 rotates relative to frame 110 in, response to a force experienced along input axis 120, DETF resonator 116 experiences either a compressive or tensile force along its longitudinal axis 121. DETF resonator 116 is either compressed or stretched when reaction mass 112 is displaced or rotated away from a null position relative to frame 110. The natural frequency of DETF resonator 116 changes when it is compressed or stretched: the natural frequency decreases below a nominal resonance frequency when DETF resonator 116 is compressed, and increases above a nominal resonance frequency when DETF resonator 116 is stretched. The resulting change in frequency is proportional to the force or acceleration applied to reaction mass 112.

A capacitor 122 is coupled across a gap 124 between frame 110 and reaction mass 112. Capacitor 122 capacitively couples an alternating current (AC) electronic drive signal applied by a drive circuit 126. Capacitor 122 thereby provides electrical coupling of the drive signal to DETF resonator 116 without physical contact that could introduce errors. By example and without limitation, capacitor 122 includes two spaced-apart capacitor plates 128, 130 mounted on movable mass 112 and capacitor body 132, respectively, with capacitor body 132 spanning gap 124. Capacitor body 132 is electrically coupled to an electrically conductive path 134 formed on frame 110 and connected to drive circuit 126. Capacitor 122 is thereby coupled for receiving AC electrical drive signals from drive circuit 126 and transmitting the drive signals to capacitor plate 130. Capacitor 122 transmits the drive signals across capacitor gap 136 between the two spaced-apart capacitor plates 128, 130, whereby the drive signals are received at reaction mass 112. Thereafter, the drive signals are carried over an electrically conductive path 138 to DETF resonator 116.

According to one embodiment of the invention, frame 110 and reaction mass 112 are optionally formed of semiconductor silicon material substrate 140 and having first and second opposing substantially parallel spaced-apart planar surfaces 142, 144. Frame 110 and reaction mass 112 are integrally formed in substrate 140 using conventional and well-known fabrication techniques with reaction mass 112 substantially coplanar with and spaced away from frame 110. Hinges 114 are integrally formed between frame 110 and reaction mass 112 positioned substantially intermediate between spaced-apart surfaces 142, 144.

According to one embodiment of the invention, capacitor 122 is optionally mounted on respective side surfaces 146, 148 of frame 110 and reaction mass 112 between opposing surfaces 142, 144 in a plane substantially perpendicular to both hinge axis 118 and input axis 120. Capacitor 122 is spaced away from the hinge axis 118 along the input axis 120 toward either of spaced-apart surfaces 142, 144 so that capacitor 122 operates with a substantial moment arm relative to the neutral hinge axis 118.

By example and without limitation, DETF resonator 116 is formed as a two-tine vibrating beam DETF resonator having two substantially parallel and spaced-apart tines 150, 152 attached between opposite mounting tabs 154, 156.

Opposite mounting tabs 154, 156 of DETF resonator 116 are mounted on frame 110 and reaction mass 112, respectively. For example, one mounting tab 154 is bonded or otherwise physically coupled to frame 110, and opposite mounting tab 156 is bonded or otherwise physically coupled to reaction mass 112. Tines 150, 152 are adapted to vibrate or oscillate at their respective natural frequencies in response to an electronic drive signal applied by drive circuit 126. When DETF resonator 116 is of a type that resonates in response to an induced oscillation, capacitor 122 provides electrical coupling of the drive signal to DETF resonator 116 without physical contact that could introduce errors.

In an alternate configuration (not shown), DETF resonator 116 may be manufactured having four tines. In a four tine DETF resonator 116, the sensing circuit may have two pair of driven and sensed tines, each pair having an inner tine and an outer tine as described in U.S. Pat. Nos. 5,367,217 and 5,331,242, both incorporated herein by reference.

DETF resonator 116 may be constructed using methods described in U.S. Pat. No. 5,948,981, which is assigned to the assignee of the present patent application and incorporated herein by reference. Optionally, DETF resonator 116 may be constructed using any of the designs known to those of skill in the art. For example, classical formulae for designing DETFs are described in U.S. Pat. No. 4,372,173 and finite element analysis techniques for designing DETFs are described in U.S. Pat. No. 5,668,329, both incorporated herein by reference.

DETF resonator 116 is optionally formed of such conventional resonator materials as silicon, quartz, and zirconia with surface electrodes formed of metal. The electrode metal may be gold, which is a highly stable and electrically conductive noble metal. However, the electrode metal is optionally selected from a group of materials that exhibit desired conductivity and adhesion properties. For example, the electrode metal is one selected from the group consisting of aluminum, chrome, molybdenum, and other equivalent materials that exhibit the desired properties. Frame 110, reaction mass 112 and hinges 114 are integrally formed of a material matching DETF resonator 116, which avoids errors due to thermal mismatch.

According to another alternative, frame 110, reaction mass 112 and hinges 114 are optionally integrally formed of monolithic silicon with DETF resonator 116 formed in an epitaxial layer formed on either surface 142 (shown) or 144 of substrate 140 and separated therefrom by a thin insulation layer, such as silicon dioxide or silicon nitrate.

Figure 6:
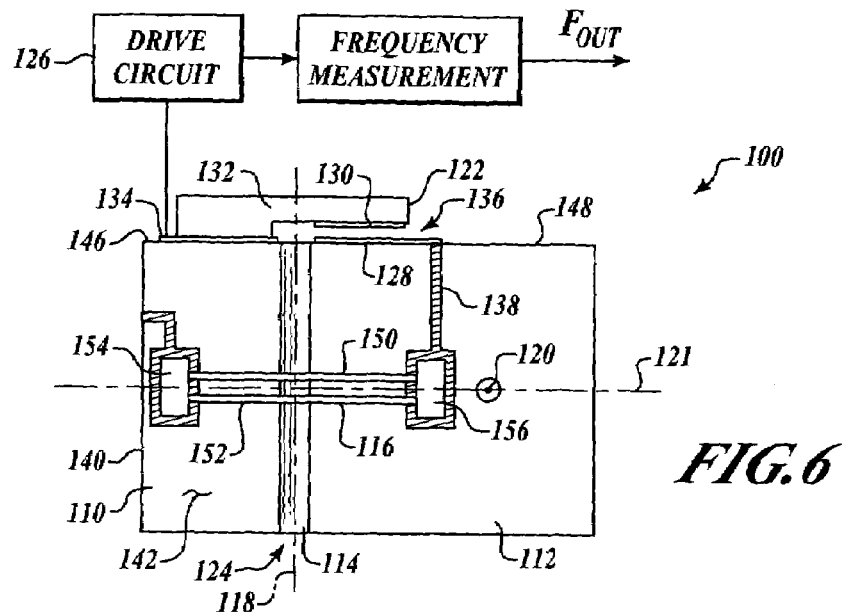
FIG. 6 is a plan view of the device of the invention that illustrates a capacitor spanning a gap between a frame and a rotationally suspended reaction mass with a DETF resonator mounted across the hinge.

FIG. 6 is a plan view of device 100 that illustrates capacitor 122 spanning gap 124 between frame 110 and reaction mass 112 when DETF resonator 116 is mounted on respective side surfaces 146, 148 of frame 110 and reaction mass 112 across hinge 114.

Figure 7:
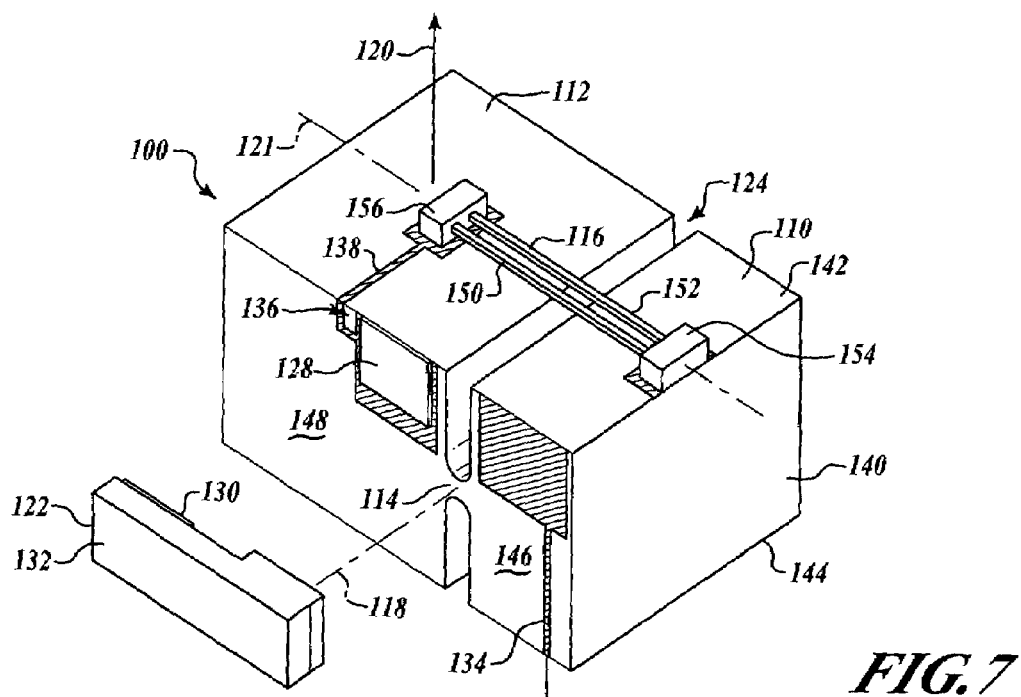
FIG. 7 is an exploded perspective view of the device of the invention that illustrates assembly of the capacitor across the gap between the frame 110 and reaction mass.

FIG. 7 is an exploded perspective view of device 100 that illustrates assembly of capacitor 122 across gap 124 between frame 110 and reaction mass 112 on respective side surfaces 146, 148.

While the preferred embodiment of the invention has been illustrated and described, it will be appreciated that various changes can be made therein without departing from the spirit and scope of the invention.

What is claimed is:

1. A micro-machined device, comprising:
    a movable mass rotatably suspended from a frame by one or more hinges for rotation relative to the frame;
    a DETF resonator suspended between the frame and movable mass; and
    a capacitor between the frame and movable mass,
    wherein the capacitor plates of the capacitor are further mounted substantially crosswise to both a hinge axis of the one or more hinges and an input axis of the movable mass.

2. The device of claim 1 wherein the capacitor further comprises a pair of spaced-apart capacitor plates between the frame and movable mass.

3. The device of claim 2 wherein the capacitor further comprises a body mounted on the frame and having one of the pair of spaced-apart capacitor plates mounted thereon.

4. The device of claim 3 wherein the capacitor body further spans a gap between the frame and movable mass.

5. The device of claim 1, further comprising an electronic drive circuit coupled to the capacitor.

6. The device of claim 5 wherein the electronic drive circuit is structured to apply an alternating current electronic drive signal to the capacitor.

7. The device of claim 1 wherein the capacitor plates of the capacitor are further mounted spaced away from hinge axis of the one or more hinges along the input axis of the movable mass.

8. A micro-machined device, comprising:
    frame and pendulous mass formed of a substrate, the pendulous mass being substantially coplanar with and spaced away from the frame;
    a hinge coupled between the frame and pendulous mass rotationally suspends the pendulous mass for relative rotational motion about a hinge axis in response to a force experienced along an input axis;
    a DETF resonator suspended between the frame and the pendulous mass; and
    a capacitor arranged between the frame and pendulous mass and spaced away from the hinge,
    wherein the substrate further comprises first and second opposing substantially parallel spaced-apart planar surfaces; and the capacitor is further positioned between the spaced-apart planar surfaces.

9. The device of claim 8 wherein the capacitor further comprises a body mounted on the frame and spanning a gap between the frame and pendulous mass, and a pair of spaced-apart capacitor plates between the body and pendulous mass.

10. The device of claim 8, further comprising an electronic drive circuit coupled to the capacitor.

11. The device of claim 10 wherein the electronic drive circuit is structured to apply an alternating current electronic drive signal to the capacitor.

12. The device (100) of claim 10 wherein the DETF resonator further comprises two substantially parallel and spaced-apart tines attached between opposite mounting tabs, the mounting tabs being mounted on frame and pendulous mass, respectively.

13. A micro-machined device, comprising:
    a frame and pendulous mass formed of a substrate, the pendulous mass being substantially coplanar with and spaced away from the frame;
    a hinge coupled between the frame and pendulous mass rotationally suspends the pendulous mass for relative rotational motion about a hinge axis in response to a force experienced along an input axis;
    a DETF resonator suspended between the frame and the pendulous mass;
    a capacitor arranged between the frame and pendulous mass and spaced away from the hinge; and
    an electrically conductive path between the capacitor and the DETF resonator.

14. A micro-machined device, comprising:
    a frame formed of a silicon semiconductor substrate having first and second opposing substantially parallel spaced-apart planar surfaces;
    a pendulous mass formed in the substrate coplanar with and spaced away from the frame by a gap;

a hinge coupled between the frame and pendulous mass rotationally suspends the pendulous mass for relative rotational motion about a hinge axis in response to a force experienced along an input axis;

a DETF resonator suspended between the frame and the pendulous mass; and a capacitor spanning the gap between the frame and pendulous mass and arranged substantially crosswise of the hinge and input axes and spaced away from the hinge axis toward one of the first and second substrate surfaces.

15. The device of claim 14 wherein the capacitor is further mounted on respective side surfaces of frame and pendulous mass positioned between the spaced-apart planar surfaces substantially crosswise of the hinge axis and input axis.

16. The device of claim 15 wherein the capacitor further comprises a body mounted on the frame and spanning the gap between the frame and pendulous mass, and a pair of capacitor plates spaced-apart across a capacitor gap between the body and pendulous mass, one of the capacitor plates being coupled to each of the body and the pendulous mass.

17. The device of claim 16, further comprising an electronic drive circuit coupled to the capacitor, the electronic drive circuit being structured to apply an alternating current electronic drive signal to the capacitor.

18. The device of claim 14, further comprising an electrically conductive path between the capacitor and the DETF resonator.

* * * * *

UNITED STATES PATENT AND TRADEMARK OFFICE
CERTIFICATE OF CORRECTION

| | |
|---|---|
| PATENT NO. | : 7,467,553 B2 |
| APPLICATION NO. | : 11/317959 |
| DATED | : December 23, 2008 |
| INVENTOR(S) | : Robert J. Meyer |

It is certified that error appears in the above-identified patent and that said Letters Patent is hereby corrected as shown below:

In the Specification

Column 1, lines 6–9: "The invention described herein was made in the performance of work under U.S. Government Contract No. F29601-03-C-0124 awarded by the Air Force Research Laboratories (AFRL)." should be changed to -- This invention was made with Government support under F29601-03-C-0124 awarded by the Air Force Research Laboratories (AFRL). The Government has certain rights in the Invention. --

Signed and Sealed this
Thirtieth Day of September, 2014

Michelle K. Lee
*Deputy Director of the United States Patent and Trademark Office*